US012595851B2

(12) United States Patent
Martin et al.

(10) Patent No.: US 12,595,851 B2
(45) Date of Patent: Apr. 7, 2026

(54) LABYRINTH SEAL ARRANGEMENT

(71) Applicant: MARTIN GmbH fur Umwelt- und Energietechnik, Munich (DE)

(72) Inventors: Johannes Ulrich Martin, Munich (DE); Christian Frei, Ampfing (DE)

(73) Assignee: MARTiN GMBH FUR UMWELT-UND ENERGiETECHNiK, Munich (DE)

( * ) Notice: Subject to any disclaimer, the term of this patent is extended or adjusted under 35 U.S.C. 154(b) by 241 days.

(21) Appl. No.: 18/196,922

(22) Filed: May 12, 2023

(65) Prior Publication Data

US 2023/0366470 A1 Nov. 16, 2023

(30) Foreign Application Priority Data

May 16, 2022 (DE) .......................... 102022001707.5

(51) Int. Cl.
*F16J 15/44* (2006.01)
*F16J 15/3272* (2016.01)
*F16J 15/447* (2006.01)

(52) U.S. Cl.
CPC ....... *F16J 15/4472* (2013.01); *F16J 15/3272* (2013.01)

(58) Field of Classification Search
CPC .... F16J 15/447; F16J 15/4472; F16J 15/4474; F16J 15/3272
See application file for complete search history.

(56) References Cited

U.S. PATENT DOCUMENTS 2,763,220 A    9/1956  Becker et al.
2,851,317 A *  9/1958  Raymon ................ F16J 15/067
                                                     277/456
(Continued)

FOREIGN PATENT DOCUMENTS

DE    000001817044    8/1969
DE    000002337909    7/1974
(Continued)

*Primary Examiner* — Christine M Mills
*Assistant Examiner* — L. Susmitha Koneru
(74) *Attorney, Agent, or Firm* — Ralph E. Jocke; WALKER & JOCKE

(57) ABSTRACT

An exemplary seal arrangement includes a labyrinth seal (1). The seal is in operative engagement with a shaft (2) that extends in an opening (3) in a wall (4) bounding a riddlings hopper (13). The exemplary shaft moves along at least one radial direction on an orbital or eccentric path within the wall opening so as to suitably cause movement of at least one grate step of a firing grate. First seal discs (5) extend radially relative to the shaft axis and are in fixed operative connection with the shaft. Second seal discs (6) also extend radially and are in fixed operative connection with a seal housing (8) that is attached to the wall. Throughout shaft movement within the opening, first seal discs continuously extend intermediate and in radially overlapping relation with second seal discs, and second seal discs continuously extend intermediate and in radially overlapping relation with first seal discs. At least one of the seal discs is comprised of a plurality of assembled angularly extending disc parts (15, 16) to facilitate removal and replacement.

21 Claims, 2 Drawing Sheets

(56)                    References Cited

U.S. PATENT DOCUMENTS

| | | | |
|---|---|---|---|
| 3,460,842 A * | 8/1969 | Pointer | .............. F16C 33/7806 |
| | | | 277/411 |
| 4,533,149 A * | 8/1985 | Vater | ......................... F16J 9/28 |
| | | | 277/499 |
| 4,804,195 A * | 2/1989 | Parker | ..................... F16J 15/40 |
| | | | 277/419 |
| 5,899,150 A | 5/1999 | Martin et al. | |
| 5,950,548 A | 9/1999 | Martin et al. | |
| 6,378,447 B1 | 4/2002 | Martin et al. | |
| 6,938,563 B2 | 9/2005 | Martin et al. | |
| 7,975,628 B2 | 7/2011 | Martin et al. | |
| 8,939,094 B2 | 1/2015 | Martin et al. | |
| 9,845,951 B2 | 12/2017 | Bachmann et al. | |
| 10,753,604 B2 | 8/2020 | Von Raven et al. | |
| 2010/0320217 A1 * | 12/2010 | Okawachi | ............. F16J 15/067 |
| | | | 277/638 |
| 2012/0112421 A1 * | 5/2012 | Sato | ...................... B26D 7/088 |
| | | | 83/17 |
| 2015/0027355 A1 | 1/2015 | Bachmann et al. | |
| 2016/0290630 A1 | 10/2016 | Von Raven et al. | |
| 2019/0063745 A1 | 2/2019 | Martin et al. | |
| 2021/0254828 A1 | 8/2021 | Papli | |
| 2021/0364164 A1 | 11/2021 | Martin et al. | |
| 2022/0113025 A1 | 4/2022 | Pupp et al. | |

FOREIGN PATENT DOCUMENTS

| | | |
|---|---|---|
| DE | 000003617279 | 11/1987 |
| DE | 000019503187 | 8/1996 |
| DE | 102005049058 | 4/2007 |

* cited by examiner

LABYRINTH SEAL ARRANGEMENT

TECHNICAL FIELD

Exemplary arrangements relate to high temperature combustion environments such as incinerators, furnaces and boiler plants. Exemplary arrangements further relate to a seal arrangement which operatively seals a wall opening in a wall of a riddlings hopper through which a shaft extends. The exemplary shaft is movable along at least one radial direction within the wall opening and is in operative connection with at least one movable combustion grate step of a combustion grate.

BACKGROUND

In some incinerators, furnaces and boiler plants combustion of the fuel occurs on a combustion grate through which air passes to facilitate burning of the fuel. In some exemplary arrangements the combustion grate extends in overlying relation of a riddlings hopper. A shaft extends through a wall opening in a wall of the riddlings hopper. A drive outside the riddlings hopper operates to cause shaft movement. The portion of the shaft that extends in the riddlings hopper is in operative connection with at least one movable combustion grate step of the combustion grate that operates to move the fuel and facilitate the combustion thereof. A seal operatively extends between the shaft and the wall to close the wall opening and avoid the material within the combustion area from escaping to the external environment and to avoid the introduction of external air into the combustion area.

In some exemplary arrangements the shaft may undergo movement in at least one radial direction. Such movement may include circular orbital movement or eccentric movement along a path, for example.

During such movement the portion of the shaft extending through the wall opening does not move axially as the shaft moves in the path along at least one radial direction.

The movement of the shaft in the riddlings wall opening can present sealing challenges. The presence of dust produced by combustion is often deposited onto the surfaces of sealing elements. The encrusting of dust or other material on the sealing elements can impede relative movement of the sealing elements, cause breakage of sealing elements or otherwise impair the sealing function.

In addition the repair and replacement of some prior sealing elements may require extensive labor and downtime.

Existing sealing elements used in connection with high temperature combustion environments may benefit from improvements.

SUMMARY

Exemplary arrangements relate to a seal that is configured to close a wall opening in a wall that bounds a riddlings hopper in a furnace, incinerator, boiler plant or other combustion environment. A shaft extends through a wall opening in the riddlings hopper into the interior area of the hopper. In exemplary arrangements the portion of the shaft within the interior area of the riddlings hopper is in operative connection with at least one movable combustion grate step or other combustion grate structure.

The exemplary shaft extends along an axis within the wall opening. The shaft within the wall opening moves along at least one radial direction while remaining axially stationary within the wall opening. An exemplary seal operatively extends between the movable shaft and the wall and closes the wall opening such that material and the environment within the interior area of the riddlings hopper is isolated from air and material outside the riddlings hopper.

An exemplary seal comprises a labyrinth seal that includes a plurality of first seal discs and second seal discs. The first seal discs extend radially relative to the shaft axis and are in axially spaced fixed operative connection with the shaft. The second seal discs are in fixed operative connection with the wall. Each of the second seal discs extends radially relative to the shaft axis and are in axially spaced relation.

In exemplary arrangements at least one first seal disc extends intermediate and in radially overlapping relation with each of a pair of immediately axially adjacent second seal discs. Further at least one second seal disc extends intermediate and in radially overlapping relation with each of a pair of immediately adjacent first seal discs. The plurality first and second seal discs remain in overlapping relation throughout the movement of the shaft in the wall opening. The exemplary discs provide a labyrinth seal that provides effective sealing between the shaft and the wall of the riddlings hopper as the shaft moves in the opening.

In exemplary arrangements at least some of the first seal discs and second seal discs are comprised of a plurality of assembled angularly extending disc parts. This arrangement with respective seal discs being comprised of a plurality of assembled angularly extending disc parts, makes it possible to more readily disassemble and remove the seal discs in the event of a need for repair or replacement of the seal discs or other related structures. Further this exemplary arrangement makes it possible to install new seal discs more easily.

Exemplary arrangements may include structures that operate to hold the assembly of disc parts in engagement to assure reliable operation. This may include in some arrangements interengaging projections and recesses on immediately adjacent disc parts for example. In other exemplary arrangements disc parts may include circumferential projections or recesses that that are configured to receive a spot or tack weld that can hold the parts together during operation but that can be relatively readily broken when there is a need for repair or replacement.

Numerous different approaches may be used in exemplary arrangements to provide an effective seal arrangement in high temperature environments such as combustion environments where fuel is burned on a combustion grate as well as in other applications.

DETAILED DESCRIPTION

Figure 1:
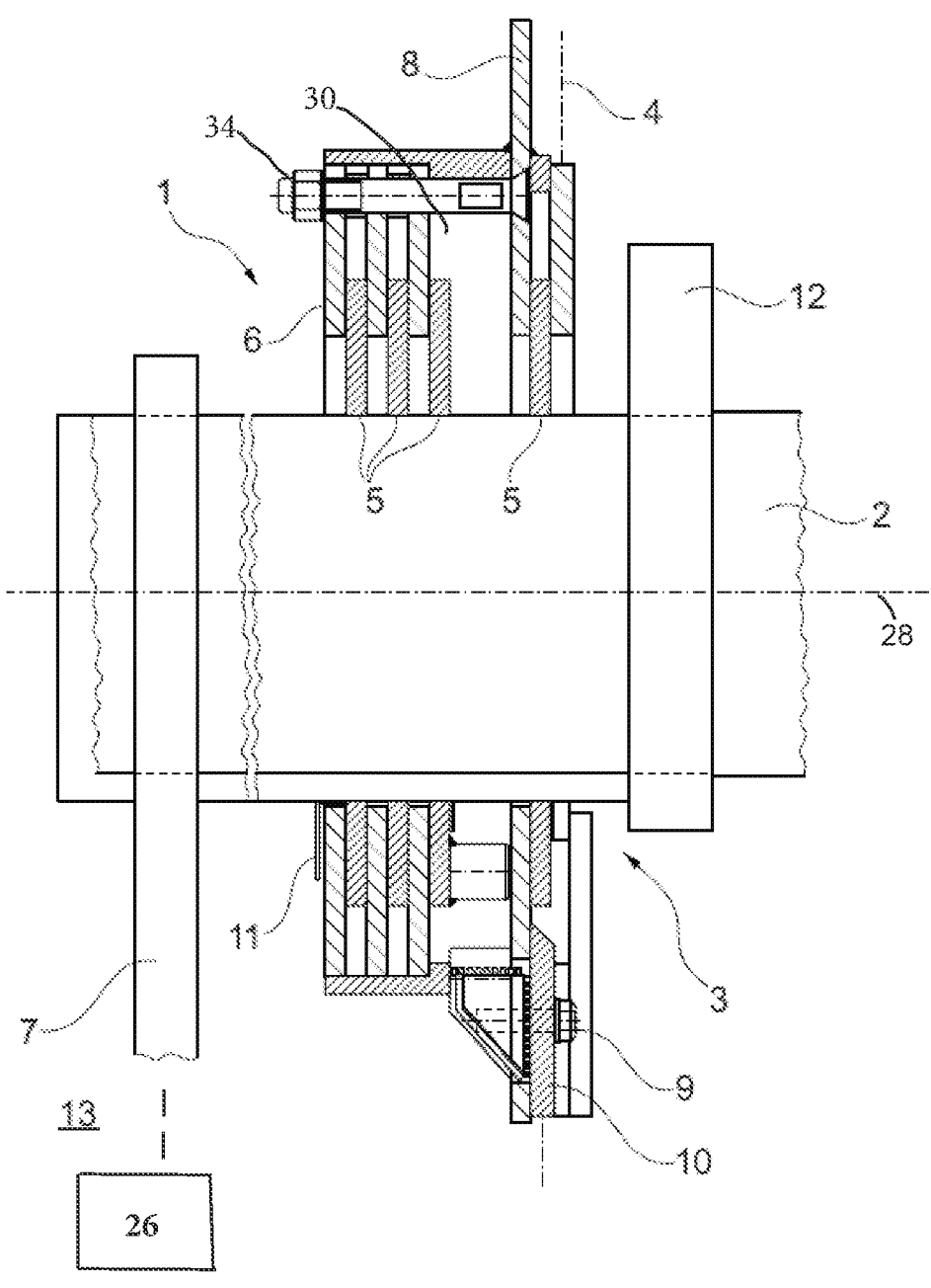
FIG. 1 is a partial cross-sectional view of an exemplary seal arrangement for an opening in a riddlings hopper.

Referring now to the drawings and particularly to FIG. 1 there is shown therein an exemplary seal arrangement. The exemplary seal arrangement is configured for use in a furnace, incinerator, boiler plant or other environment in which the combustion of fuel occurs while supported on a grate. In exemplary arrangements the grate is comprised of at least one movable grate bar which is alternatively referred to as a grate step, that is operative to move the fuel material being combusted. Exemplary structures and arrangements in such environments are shown in U.S. Pat. Nos. 2,763,220; 5,899,150; 5,950,548; 6,378,447; 6,938,563; 7,975,628; 8,939,094; 9,845,951; and 10,753,604 the disclosures of each of which are incorporated herein by reference in their entirety. Further exemplary structures and arrangements in such environments are shown in US Patent Publications 2015/0027355; 2016/0290630; 2019/0063745; 2021/0254828; 2021/0364164; and 2022/0113025 the disclosures of each of which are incorporated herein by reference in their entirety.

The exemplary seal arrangement includes a seal 1 that is used in connection with such a furnace, incinerator or boiler plant structure in which fuel is moved on a horizontally extending grate. The drive forces that cause movement of at least one grate step 26 are transmitted via a shaft 2. An internal area of a riddlings hopper 13 extends beneath the horizontal grate. The movement of the grate steps responsive to movement of the shaft 2 is operative to cause movement of the fuel and riddlings to fall into the interior area of the riddlings hopper 13.

In the exemplary arrangement the riddlings hopper 13 is bounded by a wall 4. A wall opening 3 extends through the wall to the interior area of the riddlings hopper. The shaft 2 extends in the wall opening 3. In the exemplary arrangement the shaft 2 within the wall opening extends along an axis 28. The shaft is axially stationary within the wall opening 3 but undergoes motion along a path in which the shaft moves along at least one radial direction within the wall opening. As the shaft 2 moves within the wall opening 3, the exemplary opening must be considerably larger than the diameter of the shaft 2 to enable the shaft to move along the path within the opening. Of course it should be understood that this approach is exemplary and in other arrangements the shaft may move along one or more radial directions relative to the axis of the shaft in ways that provide a uniform orbital motion, an eccentric orbital motion or other movement path as desired for movement of the shaft and at least one grate step with which the shaft is in operative connection.

The exemplary seal 1 extends across the wall opening and in operative connection between the shaft 2 and the wall 4 that bounds the riddlings hopper. The exemplary seal 1 comprises a Iammelar seal. The exemplary seal comprises a plurality of planar first seal members, which in the exemplary arrangement shown comprise seal discs 5. The first seal discs are axially spaced from one another and are in operatively fixed connection with the shaft 2.

The exemplary seal further includes a seal housing 8. The exemplary seal housing is in fixed operatively attached connection with the wall 4. The seal housing bounds a housing interior area 30. A plurality of planar second seal members 6 in the operative position are in fixed operative connection with the seal housing 8 and the wall 4. In the exemplary arrangement the second seal members 6 comprise planar second seal discs which extend radially relative to the shaft 2. The second seal discs are axially spaced from one another.

In the exemplary arrangement at least one of the first seal discs 5 extends radially intermediate of and in radially overlapping relation of each of an immediately axially adjacent pair of second seal discs 6 within the housing interior area 30 of the seal housing 8. Also in the exemplary arrangement at least one of the second seal discs 6 extends radially intermediate of and in radially overlapping relation of each of an immediately axially adjacent pair of first seal discs 5. Of course it should be understood while in the exemplary seal arrangement each of a plurality of respective first seal discs 5 are in intermediate radially overlapping relation with a pair of second seal discs 6, and a plurality respective second seal discs 6 are in intermediate radially overlapping relation with the pair of first seal discs 5, other exemplary arrangements may have only one first or second seal disc in intermediate radially overlapping relation with a pair of the other the first or second seal discs. Further it should be appreciated that other configurations of planar relatively movable sealing members may be utilized in other seal arrangements.

In the exemplary seal 1 the combination of the first and second seal discs which extend in radially overlapping relation, remain continuously in such overlapping relation to maintain the area between the shaft 2 and the wall opening 3 operatively closed as the shaft 2 moves within the opening. As can be appreciated, during such movement the plurality of first seal discs and the plurality of second seal discs move relative to one another as the shaft moves along the at least one radial direction in its orbital, eccentric or other path.

As shown in FIG. 1 the shaft 2 is in operative connection with a drive lever 7. As schematically represented, the drive lever 7 in the exemplary arrangement is positioned within the interior area of the riddlings hopper and is in operative connection with at least one grate step 26 of firing grate. A torsion lever 12 is in operative connection with the shaft 2 externally of the riddlings hopper and responsive to operation of a drive, is operative to impart the desired motion to the shaft. Further in the exemplary arrangement a safety sheet 11 is provided at the axially inboard end of the housing 8 to minimize the infiltration of dust and other material from the riddlings into the housing interior area 30. The exemplary seal housing 8 further includes a cleaning opening 10. The exemplary cleaning opening is usable to enable the removal of dust and other material from the housing interior area 30. At least one screw 9 is used in the exemplary arrangement to maintain a cover in place over the cleaning opening 10 during operation of the system.

In the exemplary arrangement each of the seal discs 5, 6 is comprised of plurality of assembled angularly extending disc parts 15, 16. In the exemplary arrangement of the seal disc 5 shown in FIG. 2, the disc parts comprise an upper disc half 15 and a lower disc half 16. In this exemplary arrangement the disc parts extend angularly 1800 and each seal disc is comprised of two disc parts. However it should be understood that this arrangement is exemplary and in other arrangements seal discs may be comprised of a greater number of disc parts. In some exemplary arrangements each disc may be comprised of 3, 4 or even more disc parts depending on the size and required properties of the seal discs.

Figures 2, 3:
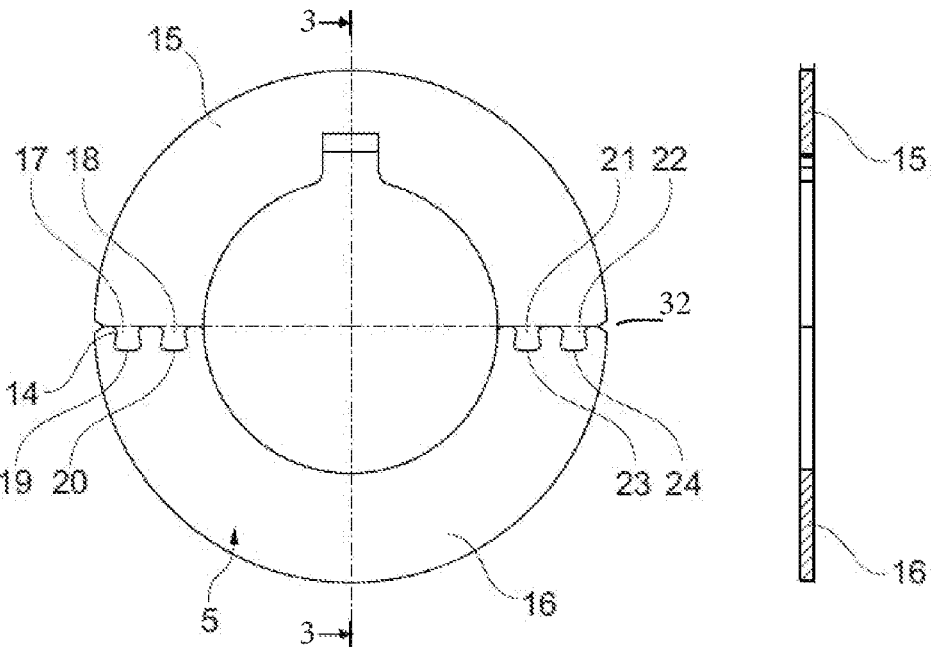
FIG. 2 is a plan view of an exemplary seal disc used in the exemplary seal arrangement.
FIG. 3 is a cross-sectional view of the exemplary seal disc along line 3-3 in FIG. 2.
Figures 4, 5:
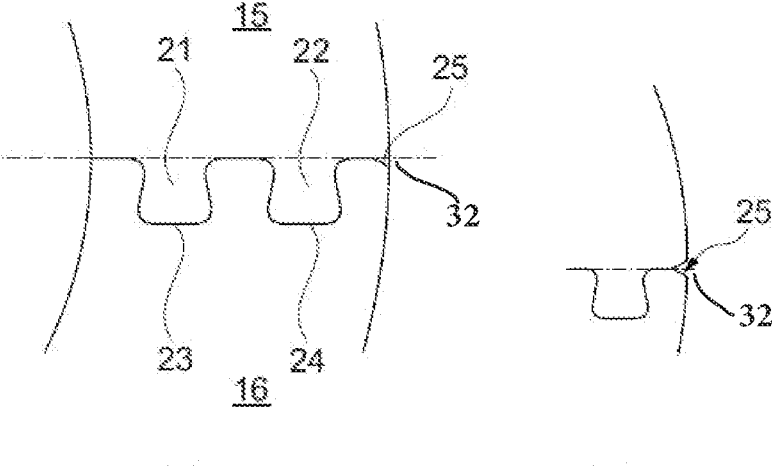
FIG. 4 is an enlarged view of an area of the exemplary seal disc of FIG. 2 showing exemplary interengaging projections and recesses which are operative to hold together the assembled disc parts.
FIG. 5 shows an enlarged view of a portion of FIG. 4 including a disc part recess at a circumferential location that is configured to receive a weld.

As shown in FIGS. 2 and 4 in the exemplary arrangement the disc parts include interengaging projections and recesses which serve to hold the disc parts in the assembled condition. In the exemplary arrangement at the point of intersection 14 at which the disc parts 15, 16 are in abutting engagement, two projecting elements 17, 18 of the upper disc half 15 engage in corresponding recesses 19, 20 of the lower disc half 16. Further in the exemplary arrangement and as shown on an opposed side, two projecting elements 21, 22 of the upper disc half 15 are engaged in corresponding recesses 23, 24 of the lower disc half 16.

As shown in the exemplary arrangement the interengaging projections and recesses of the exemplary arrangement are configured such that the recesses, 19, 20, 23 and 24 have undercuts, which engage with enlarged areas of the projections 17, 18, 21 and 22 so as to prevent the disengagement of the assembled disc parts. Of course it should be understood that this arrangement of interengaging projections and recesses is exemplary and in other arrangements other configurations may be used. For example in other exemplary arrangements the projections and recesses may include generally circular projections which engage correspondingly generally circular recesses to provide a buttonhole connection. Alternatively in some arrangements angled swallow tail shape which is alternatively referred to herein as dove tail shape interengaging projections and recesses may be used. Of course it should be understood that these arrangements are exemplary and numerous different types of arrangements may be utilized for purposes of maintaining the disc parts in assembled engaged relation.

Further in the exemplary arrangement in at least one circumferential location in which a pair of immediately adjacent discs parts are in engagement, at least one seal disc includes at least one disc part projection or recess 32. In the arrangement shown in FIGS. 2, 4 and 5 a recess is shown at a circumferential location corresponding to the periphery of the intersection 14. However it should be understood that in other arrangements a projection may extend on one or both immediately adjacent disc parts. In exemplary arrangements the at least one projection or recess 32 is configured to receive a weld that is operative to hold the immediately adjacent disc parts in fixed connection. In exemplary arrangements the weld may comprise a tack weld or spot weld that is suitable for holding the disc parts engaged, but that can be broken when it is desired to separate the disc parts and remove the seal discs.

In the exemplary arrangement shown each of the generally planar seal discs 5, 6 include opposed flat planar facing surfaces. As shown in FIG. 1 the planar facing surfaces are in close adjacent relation with the immediately adjacent seal discs to minimize the space available for passage of material radially between the discs. However it should be understood that in alternative arrangements the surfaces may include contoured troughs or other surface features that prevent the accumulation of dust or other contaminants between the immediately adjacent seal disc surfaces and/or that cause material between the disc faces to be urged to move to the periphery and away from the disc faces responsive to the disc movement. Further the disc faces may also include other features to facilitate relative disc movement and/or to minimize the accumulation of contaminants. Of course it should be understood that in the exemplary arrangements the immediately adjacent faces of the discs are sufficiently axially disposed from one another so that the first and second seal discs are enabled to move relative to one another without binding or breakage when the shaft moves along the at least one radial direction. Further as can be appreciated, the radially overlapping relation of the exemplary seal discs provides for a labyrinth type seal which effectively seals the opening 3 at all points along the path of travel of the shaft 2 relative to the wall opening 3. Of course it should be understood that these approaches are exemplary and other arrangements other approaches may be used.

As shown in FIG. 1 the exemplary seal housing 4 is in releasably attached in fixed operative connection with the wall 3 and the second seal discs 6 via releasable fasteners 34.

In situations where the seal discs have become worn or damaged and need to be replaced, the fasteners 34 may be released. This enables access to the housing interior area 30 such that the seal discs can be more readily removed. Further the exemplary configuration in which the seal discs are comprised of a plurality of assembled angularly extending disc parts enables the seal discs to be separated into their constituent disc parts to facilitate the removal of the worn or damaged parts. Likewise the ability to install new seal discs is facilitated by the ability to assemble the angularly extending disc parts into a seal disc for purposes of placement within the seal arrangement. Particular configurations of the seal discs and the number of angularly extending disc parts may be selected in a manner that facilitates the removal and replacement of the particular seal structures in the particular machine environment. This capability of the exemplary arrangement facilitates the repair of the seal arrangement and reduces the amount of time that the combustion arrangement must be out of service for purposes of making the repairs.

Of course it should be understood that while the exemplary seal arrangement is utilized in connection with a movable firing grate step arrangement and a moving shaft that extends in an opening of a wall which bounds a riddlings hopper, the seal features and relationships described herein may also be used in other types of devices and applications.

Thus the exemplary arrangements described herein achieve improved operation, eliminate difficulties encountered in the use of prior devices and systems, and attain the useful results described herein.

In the foregoing description, certain terms have been used for brevity, clarity and understanding. However no unnecessary limitations are to be implied therefrom because such terms are used for descriptive purposes and are intended to be broadly construed. Moreover the descriptions and illustrations herein are by way of examples and the new and useful features and relationships are not limited to the exact features that have been shown and described.

Further it should be understood that the features and/or relationships associated with one exemplary arrangement can be combined with features and/or relationships from another exemplary arrangement. That is, various features and/or relationships from various exemplary arrangements can be combined to produce further arrangements. The new and useful scope of the disclosure presented herein is not limited only to the exemplary arrangements that have been shown and described.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:
1. Apparatus comprising:
   a seal configured to close a wall opening in a wall bounding a riddlings hopper, through which wall opening a movable shaft extends,
   wherein the shaft
      extends along a shaft axis within the wall opening,
      wherein the shaft axis is radially movable and axially stationary within the wall opening,
   wherein the seal includes:

a plurality of first seal discs, wherein each of the first seal discs extends radially relative to the shaft axis, and is in fixed non-sliding connection with the shaft, a plurality of second seal discs, wherein each of the second seal discs extends radially relative to the shaft axis, and is in fixed operative connection with the wall, wherein at least one of a respective first seal disc extends radially intermediate and in radially overlapping relation with each second seal disc of an immediately axially adjacent pair of the second seal discs, and a respective second seal disc extends radially intermediate and in radially overlapping relation with each first seal disc of an immediately axially adjacent pair of first seal discs, wherein in combination the first and second seal discs that comprise the at least one of the respective first seal disc that extends radially intermediate of each of the axially adjacent pair of second seal discs, and the respective second seal disc that extends radially intermediate of each of the adjacent pair of first seal discs, continuously extend in radially overlapping relation to operatively close the wall opening as the first seal discs and the second seal discs move relative to one another responsive to shaft movement in the wall opening, wherein at least one of the first seal discs and the second seal discs is respectively comprised of a plurality of assembled angularly extending disc parts.

2. The apparatus according to claim 1 wherein a plurality of the first seal discs each respectively extend intermediate and in radially overlapping relation with each second seal disc of an immediately axially adjacent pair of the second seal discs, and wherein a plurality of the second seal discs each respectively extend intermediate and in radially overlapping relation with each first seal disc of an immediately axially adjacent pair of the first seal discs.

3. The apparatus according to claim 1 wherein the shaft and each of the plurality of first seal discs is rotationally movable relative to the wall opening.

4. The apparatus according to claim 1 wherein the at least one of the first seal discs and the second seal discs is comprised of no more than four assembled disc parts.

5. The apparatus according to claim 1 wherein the at least one of the first seal discs and the second seal discs is comprised of an assembled pair of disc parts.

6. The apparatus according to claim 1 wherein each of the first seal discs and the second seal discs is comprised of a plurality of respective assembled disc parts.

7. The apparatus point of claim 1 wherein the assembled angularly extending disc parts of a respective first seal disc or a respective second seal disc are engaged through interengaging projections and recesses.

8. The apparatus according to claim 1 wherein the assembled angularly extending disc parts of a respective first seal disc or a respective second seal disc are engaged through interengaging projections and recesses, wherein the interengaging projections and recesses include at least one of an undercut connection, a buttonhole connection, or a swallow tail connection.

9. The apparatus according to claim 1 wherein the assembled angularly extending parts of a respective first seal disc or a respective second seal disc include at least one disc part projection or recess at a circumferential location at which a pair of immediately adjacent disc parts are in engagement, wherein the at least one disc part projection or recess is configured to receive a weld that is operative to hold the immediately adjacent disc parts in engagement.

10. The apparatus according to claim 1 wherein the seal further includes a housing, wherein the housing is in fixed operative connection with the wall, wherein each of the plurality of second seal discs are in fixed operative connection with the housing.

11. The apparatus according to claim 1 wherein the seal further includes a housing, wherein the housing is in fixed operative connection with the wall, bounds a housing interior area, wherein each of the second seal discs are in fixed operative connection with the housing and extend in the interior area.

12. The apparatus according to claim 1 wherein the hopper includes a hopper interior area, wherein the seal further includes a housing, wherein the housing is in fixed operative connection with the wall, bounds a housing interior area, and extends within the hopper interior area, wherein each of the second seal discs are in fixed operative connection with the housing and extend in the housing interior area.

13. The apparatus according to claim 1 wherein the seal further includes a housing, wherein the housing is in fixed operative connection with the wall, bounds a housing interior area, wherein the second seal discs are in fixed operative connection with the housing and extend in the housing interior area, includes a clean out opening, wherein material within the housing interior area is removable through the clean out opening.

14. The apparatus according to claim 1 wherein the shaft is in operative connection with a radially extending lever within the hopper, wherein the lever is configured to be in operative connection with at least one movable combustion grate step.

15. The apparatus according to claim 1 and further comprising a movable combustion grate step, wherein the shaft is in operative connection with the movable combustion grate step.

16. Apparatus comprising:

a seal, wherein seal is configured to extend in operative sealing relation between a wall opening in a wall that bounds a riddlings hopper and a shaft that extends through the wall opening, wherein within the wall opening the shaft extends along a shaft axis and is movable along at least one radial direction within the wall opening, wherein the seal includes:

a plurality of planar first seal members, wherein each of the first seal members extends radially relative to the shaft axis, is in fixed non-sliding connection with the shaft, and is axially disposed from each of the other first seal members, a plurality of planar second seal members, wherein each of the second seal members extends radially relative to the shaft axis, is in fixed operative connection with the wall, and is axially disposed from each of the other second seal members, wherein at least one first seal member continuously extends radially intermediate and in radially overlapping relation of each of an immediately axially adjacent pair of second seal members throughout shaft movement in the wall opening, and wherein at least one second seal member continuously extends radially intermediate and in radially overlapping relation with each of an immediately axially adjacent pair of first seal members throughout shaft movement in the wall opening, wherein at least one of the first seal members and second seal members is respectively comprised of a plurality of assembled angularly extending seal member parts.

17. The apparatus according to claim 16 wherein the plurality of assembled angularly extending seal member parts of a respective first seal member or a respective second seal member are held engaged through engagement of interengaging projections and recesses.

18. The apparatus according to claim 16 wherein each of the plurality of planar first seal members comprises a first seal disc, wherein each of the plurality of planar second seal members comprises a second seal disc, wherein the first and second seal discs are movable relative to one another along the at least one radial direction with shaft movement.

19. The apparatus according to claim 16 wherein the assembled angularly extending seal member parts of a respective first seal member or a respective second seal number include at least one seal member projection or recess at a location at which a pair of immediately adjacent seal member parts are in engagement, wherein the at least one seal member projection or recess is configured to receive a weld that is operative to hold the immediately adjacent seal member parts in engagement.

20. The apparatus according to claim 16 wherein the seal further includes:

a housing, wherein the housing bounds a housing interior area, is in fixed operative connection with the wall, wherein each of the planar second seal members are in fixed operative connection with the housing, and wherein each of the first seal members and second seal members are housed within the housing interior area.

21. Apparatus comprising:

a seal, wherein seal is configured to extend in operative sealing relation between a wall opening in a wall that bounds a riddlings hopper and a shaft that extends through the wall opening, wherein within the wall opening the shaft extends along a shaft axis and is movable in at least one radial direction within the wall opening, wherein the seal includes:

a plurality of planar first seal members, wherein each of the first seal members extends continuously outward from the shaft and radially relative to the shaft axis, is in fixed non-sliding connection with the shaft, and is axially disposed from each of the other first seal members, a plurality of planar second seal members, wherein each of the second seal members extends radially relative to the shaft axis, is in fixed operative connection with the wall, and is axially disposed from each of the other second seal members, wherein at least one first seal member continuously extends intermediate of and in radially overlapping relation of each of an immediately axially adjacent pair of second seal members throughout shaft movement in the wall opening, and wherein at least one second seal member continuously extends intermediate of and in radially overlapping relation with each of an immediately axially adjacent pair of first seal members throughout shaft movement in the wall opening, wherein at least one of the first seal members and second seal members is respectively comprised of a plurality of assembled angularly extending seal member parts.

* * * * *